United States Patent [19]

Beaujean

[11] Patent Number: 4,581,729
[45] Date of Patent: Apr. 8, 1986

[54] CASE CONTAINING OPTICALLY READABLE CARRIER STRUCTURE AND APPARATUS FOR USING SAME

[75] Inventor: Joseph M. E. Beaujean, Venlo, Netherlands

[73] Assignee: Bogey B.V., Venlo, Netherlands

[21] Appl. No.: 554,848

[22] Filed: Nov. 23, 1983

Related U.S. Application Data

[63] Continuation of Ser. No. 192,042, Sep. 29, 1980, abandoned.

[30] Foreign Application Priority Data

Oct. 1, 1979 [NL] Netherlands ............... 79 07289

[51] Int. Cl.[4] .................. G11B 7/00; G11B 23/00
[52] U.S. Cl. .................... 369/99; 369/112; 369/114; 369/115; 369/118; 352/72; 352/78 R
[58] Field of Search ............. 369/109, 112, 113–115, 369/117–118, 99; 360/132; 352/72, 78 R, 231, 228

[56] References Cited

U.S. PATENT DOCUMENTS

| | | | |
|---|---|---|---|
| 1,856,524 | 5/1932 | Whitaker et al. | 369/113 |
| 1,933,783 | 11/1933 | Wittel | 352/228 |
| 1,989,836 | 2/1935 | Whitman | 369/112 |
| 1,996,732 | 9/1932 | Whitman | 369/114 |
| 2,039,436 | 5/1936 | Moore | 369/114 |
| 3,007,382 | 2/1957 | Bok | 354/213 |
| 3,615,127 | 10/1971 | Land | 352/78 R |
| 3,627,407 | 12/1971 | Cook | 352/78 R |
| 3,792,910 | 2/1974 | Holmes | 352/72 |
| 3,840,973 | 10/1974 | Potter | 352/72 |
| 3,994,581 | 11/1976 | Hopkins et al. | 355/72 |
| 4,079,431 | 3/1978 | Marut | 360/132 |
| 4,149,781 | 4/1979 | Everett, Jr. | 352/72 |

FOREIGN PATENT DOCUMENTS

| | | | |
|---|---|---|---|
| 420302 | of 1925 | Fed. Rep. of Germany . | |
| 2062459 | of 1972 | Fed. Rep. of Germany . | |
| 6609173 | of 1968 | Netherlands . | |
| 415177 | 8/1934 | United Kingdom | 369/112 |
| 1363799 | of 1974 | United Kingdom . | |

*Primary Examiner*—Robert L. Richardson
*Attorney, Agent, or Firm*—Martin Smolowitz

[57] ABSTRACT

A case provided with an information carrier consisting of a tape, one side of which has a structure carrying optically readable information as well as an apparatus for writing, reading or erasing such information. In the dustproof case containing a tape having on one side a structure carrying optically readable information, the tape is accomodated on two reels. The case is provided with one window through which a part of the tape between the reels is visible and with pressing means for urging that visible part of the tape against the window. This pressing means may be a wheel and the window may have the shape of a cylindrical lens.

17 Claims, 5 Drawing Figures

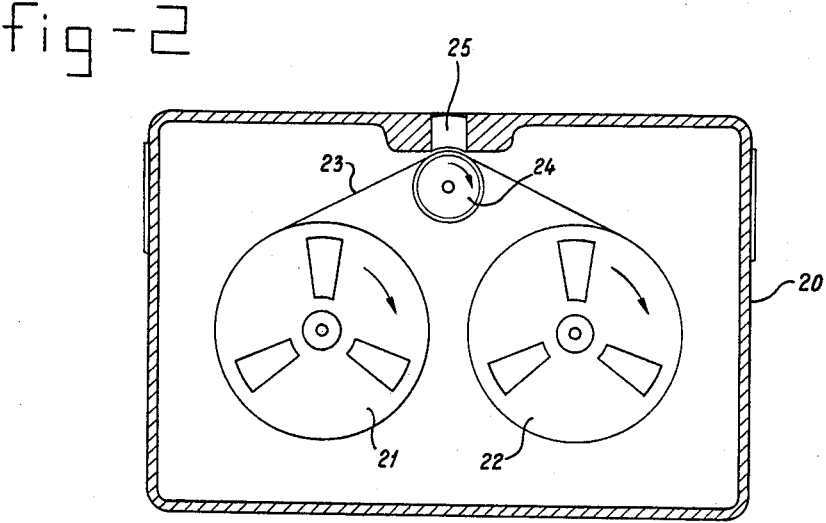

CASE CONTAINING OPTICALLY READABLE CARRIER STRUCTURE AND APPARATUS FOR USING SAME

This is a continuation of application Ser. No. 192,042 filed Sept. 29, 1980 now abandoned.

BACKGROUND OF INVENTION

A case provided with an information carrier consisting of a tape one side of which has a structure carrying optically readable information as well as an apparatus for writing, reading or erasing such informtion.

The present invention relates to a case with an information carrier consisting of a tape one side of which has a structure carrying optically readable information, which case is a dustproof housing enclosing two reels accomodating said moving tape, said housing being provided with a window which is positioned such that a part of the tape present between the two reels is visible through this window. The case is furthermore provided with pressing means for guiding the tape in such a manner that the part of said tape visible through said window is kept in accurately fixed position with respect to this window.

The present invention furthermore relates to an apparatus for writing, reading or erasing information on such an information carrier in such a case.

Such a case provided with an information carrier for optically readable information is known from the British Patent Specification No. 1,363,799 which discloses a film cassette provided with two reels accomodating a film strip. This film strip may be exposed, developed and projected while it is not required to open the cassette and to remove the film therefrom. To that effect the cassette is among others provided with two windows. A part of this film strip present between said two reels is located behind one of the windows and is visible through this window from the outside. Through this window the film strip may be exposed. A second window serves for projecting images present on said film strip. Through this window light from a projection lamp is transmitted into the cassette and falls upon incidence through a first face of a prism mounted in said cassette. In this prism is reflected completely by a second face of this prism the light and leaves said prism through a third face of this prism whereafter it is transmitted through said film strip and said first window to the exterior. Hence the images present on said film strip are projected by means of passing light entering the cassette through a window, falling upon the film strip after reflection by a reflecting means and leaving said cassette again after passing said film strip through the other window. The projected part of the film strip is present between the inner side of one of the windows and one face of a prism fixedly mounted behind said window. Upon exposure the part of the film strip to be exposed is also present in the same position.

It is known that optically readable information present on a carrier in the shape of a disc or tape may be read out by means of light emitted by a light source mounted at one side of said carrier, by focusing the light on a small area of the carrier and receiving the light reflected by the carrier by a detector mounted at the same side of the carrier. The carrier is provided with an information carrying structure on that side at which the light source and the detector are present upon reading out. In this structure there are provided fields differing in an optically detectable manner. For instance, these fields may have different reflection coefficients for light of a predetermined wave length, or for light of a predetermined direction of polarization. The information carrying structure may also consist of alternately higher and lower reflecting fields. The difference in height between these two types of fields may amount to about $\frac{1}{4}$ of the wave length of the light by which the information is read out. A light beam reflected by a lower field then covers a path which is longer by half a wave length than that of a light beam reflected by a higher field, so that these two light beams are consequently in opposite phase and extinguish one another. When a focused light beam strikes a part of the surface of the carrier consisting partially of a higher field and partially of a lower field, the detector will detect no or but little reflected light. When contrary thereto a focused beam strikes a part of the surface of the carrier solely comprised of a higher (or a lower) field, the detector will detect a considerable quantity of reflected light. In the known carriers the main part of the surface of the tape is normally covered by higher fields, while at least one dimension of the lower fields is in the order of magnitude of 1 $\mu$m. It is obvious that dust particles always present in the air may cause a highly disturbing effect if they precipitate onto the information carrying structure. Therefore the information carrying reflecting side of the carrier is usually coated with a protective transparent layer.

The provision of such a protective transparent layer is, however, not necessary if the information carrier is enclosed within a dustproof case.

SUMMARY OF INVENTION

The object of the present invention is to provide a case with an information carrier for optically readable information, from which the information on the carrier tape may be read without opening the case. To that effect the case has been provided with one window for passing both incident light and light reflected by the information carrier, while it is furthermore assured that one side of the information carrier is continuously contacted with the innerside of said window.

The object of the invention is therefore achieved by a case provided with a carrier consisting of a tape for optically readable information of the type mentioned above, said case provided with said information carrier tape being characterized according to the invention in that the closed dustproof housing encloses two reels accommodating the tape and is provided with one window only, and that the case is furthermore provided with pressing means positioned opposite to the window urging the part of the moving tape visible through this window against said window.

Usually each one of the reels in the case will be a rotatable part on which the tape may be wound or from which the tape may be unreeled. It is also feasible however to use a construction in which the tape is wound on the outside of a reel and simultaneously unreeled from the inside of the same reel. There will also be present a driven roller over which the tape will run optionally in combination with a backing roller urging the tape against the driven roller. In the present specification such a roller is likewise indicated by the term reel so that the construction described above is also encompassed by the term "apparatuses provided with two reels".

Advantageously the window is a cylindrical lens, the axis of which runs parallel to the direction of the width of the tape and the length of said lens in the direction of the axis at least equals the width of said tape. Thereby a light beam may be focused on the tape in the form of a narrow band of light running in the direction of the width of the tape, or even in the form of a small spot on the tape if there are yet other focusing means apart from the window. A window in the shape of a cylindrical lens furthermore creates the possibility to cast a focused beam having a large angular aperture onto the tape, thus increasing the detection possibility of very small fields. Furthermore, a cylindrical lens has the advantage of providing a larger plane of incidence for the light beam than a flat window whereby scratches or dust particles present on said plane of incidence will exercise a less disturbing effect.

It is very important that the part of the tape present behind the window is kept in an accurately fixed position with respect to this window. It is recommended therefore that the part of the surface of the pressing means abutting against said tape is of a concave shape in the direction of the width of the tape. Thereby it is achieved that the tape will always occupy the same position with respect to said pressing means and consequently also with respect to the window. For achieving this result, it will of course be necessary that the tape is moved in such a manner that said tape is always kept tight and will consequently be in close contact with said pressing means.

If the window is a (cylindrical) lens having a curved image plane, the application of a pressing means having a concave surface offers also the advantage that the same curvature as that of the image plane of the lens may be imparted to the tape at least in one direction at the location of the pressing means, whereby a good focusing is highly promoted.

In order to decrease the friction between the tape and the pressing means and consequently also to decrease the wear of the tape caused thereby, the pressing means may be in the shape of a disc supported rotatably within said case, said disc having a substantially cylindrical side wall.

It has already been mentioned above that it is known to provide the information carrying structure on that side of the tape at which the light source and the detector are provided upon reading. In the case provided with an information carrier according to the invention it is, however, also possible to provide the information carrying structure at the side opposite to the light source and the detector, i.e. in fact the side of the tape facing the surface of the pressing means. The tape should of course be transparent.

The information carrying structure may then comprise alternately higher and lower fields, while the surface of the pressing means should be reflective. The difference in height between the higher fields and the lower fields is selected in such a manner that the optical difference in length of the path between a light beam passing through the tape at the location of a higher field, reflected by the reflecting surface of the pressing means and entering the tape again through the higher field, and a light beam passing through the tape at the location of a lower field, running through the air gap between the lower field and the reflecting surface of the pressing means and upon reflection again running through this air gap and entering the tape again at the location of the same lower field, will amount to just half a wave length. A good operation will be assured if the optical density of the material of the higher fields is more than 1.2.

It is also possible to utilize a tape made of a transparent material having a refractive index of about 1.5 and in which the front side of the tape is provided with alternately higher and lower fields, the difference in height between the two types of fields equaling halve the wave length of the light used for reading. The lower fields can be provided with a reflective layer or not.

In accordance with another embodiment it is possible that there is provided a reflective layer on the side of the tape facing the pressing means and that there are fields in which this reflective layer is absent. The surface of the pressing means is reflective and the distance between this surface and the surface of the transparent tape is made to equal ¼ of the wave length in air of the light to be used. Such a distance may be obtained by applying a reflective layer the thickness of which equals ¼ of the said wave length. The reflective layer does, however, not have to possess this thickness everywhere. It may be advantageous that this layer is of a smaller thickness in those areas where there are fields from which this layer should completely be removed in order to record or to alter information. The removal of the layer in these fields may thereby be facilitated.

Again another possibility for obtaining the said distance between the one surface of the transparent tape and the reflective surface of the pressing means resides in the use of a reflective layer having a very slight thickness everywhere and in the provision of a transparent layer on the reflective surface of the pressing means, while providing that the sum of the thickness of the reflective layer on the tape and the optical thickness of the transparent layer on the reflective surface of the pressing means equals ¼ of the said wave length. A light beam passing through the transparent tape at a location at which the reflective layer is present will be reflected immediately by this layer. A light beam falling on the tape, however, at a location of a field from which the transparent layer is removed will leave the tape at that location, run through the gap between the transparent tape and the reflective surface of the pressing means, will be reflected by this surface, run again through this gap and thereupon enter the tape again. It will furthermore be obvious that the difference in path length between the two light beam will amount to just half a wave length.

Some of the above suggested constructions may be combined.

An information carrying structure may for instance consist of fields on which a layer of reflective material is present, alternated by fields on which there is provided a layer of transparent material having the same thickness.

In all instances the above discussion concerned two reflected light beams which have traversed optical paths the lengths of which differ by half a wave length, so that these light rays are in opposite phase and will extinguish one another. It is however also possible to operate with an optical difference in path length of for instance ¼ or ¾ of the wave length, whereby it is true that no complete extinction will occur in the main direction though there is yet obtained a considerable attenuation of the light beams which may moreover vary in different directions.

Yet another possibility is the use of an information carrier having a flat surface consisting of fields having different coefficients of reflection for the light used in reading. There may for instance be used a layer of europium that may exist in a permanently magnetized condition as well as in a non-magnetized condition. A transition from the magnetized condition into the non-magnetized condition may be caused by local heating of the layer of europium. The two conditions differ among others by greatly differing coefficients of reflection for polarized light.

Where the invention opens the possibility to use a tapelike information carrier the information carrying structure of which is not covered, it becomes possible to add information to or to withdraw information from this exposed information carrying structure. If there is utilized more in particular a tapelike carrier having an information carrying structure on the side facing the pressing means, said information carrying structure being constituted by a reflective layer provided on the tape but removed in certain fields there may be added or erased information by removing parts of the reflective layer or providing a reflective layer at locations where this layer is absent, respectively. More in particular, this possibility exists if the reflective layer is entirely or mainly comprised of a material capable of being evaporated or atomized by means of light of a determined intensity. Such a material may for instance consist of indium, tin, or rhodium or of an alloy of two or three of these metals.

For reading a tape having such an information carrying structure there is used a light beam the energy density of which on the tape is so small that neither the transparent tape as such nor the reflective layer is affected by this light. If contrary thereto one desires to remove certain parts of the reflective layer there will be used a light beam the energy density of which on the tape is so high that the transparent material of the tape is not changed thereby but the material of the reflective layer is evaporated or atomized.

If on the reflective surface of the pressing means there is provided a layer of the above said material capable of being evaporated or atomized by means of light having a predetermined intensity it is possible to coat a field having no reflective layer by focusing a light beam on a part of the surface of the pressing means in such a manner that the material present on this part of the surface will be atomized or evaporated and precipitated on the said field whereby this field is coated with a reflective layer.

As the information carrier there may be used more in general a tape entirely or partially consisting of a material capable of existing in two physically and/or chemically different conditions in which these conditions may be distinguished optically and a transition from the one to the other condition may be effected by irradiation with light. Apart from the above mentioned materials capable of being evaporated or atomized or demagnetized by irradiation with light there may also be used materials which are subject to change in colour upon irradiation or which may exist in a crystalline and in an amorphous condition in which these conditions have different specific volumes. The transition from the one condition to the other one may be effected by melting followed by cooling at a predetermined rate.

BRIEF DESCRIPTION OF DRAWINGS

The invention will now be elucidated further with reference to the drawings, in which:

FIG. 2 shows a cross section of a case provided with a carrier tape, pressing means and window according to the invention and;

DESCRIPTION OF INVENTION

Figure 1A:
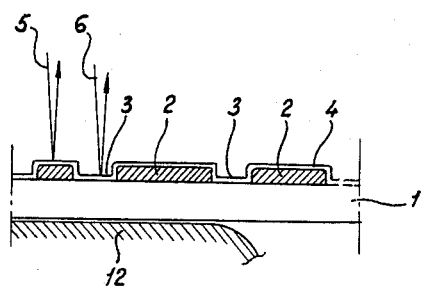
FIGS. 1a-1c show cross sections of information carrier tapes on which optically readable information has been provided.

With reference to FIG. 1a, there is shown a cross section of a known tapelike information carrier 1 provided with an information carrying structure at the side facing the light source and the detector when reading. This structure consists of higher fields 2 and lower fields 3, both types of these fields being covered with the reflective layer 4. The difference in height between a field 2 and a field 3 amounts to $\frac{1}{4}$ of the wave length in air of the light to be used. Upon reflection the difference in path length between the light beams 5 and 6 thus amounts to half a wave length. The fields 2 and 3 may be coated with a protective transparent layer (not shown in the drawing).

Figure 1B:
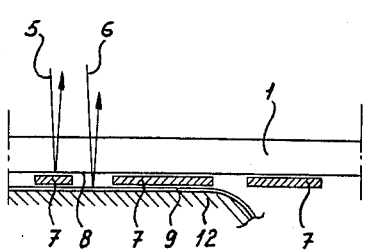

With reference to FIG. 1b, there is shown a cross section of a tape according to the invention. At the side (the lower side) facing the pressing means, the tape 1 made of a transparent material is provided with a reflective layer having a thickness equaling $\frac{1}{4}$ of the wave length in air of the light to be used. This reflective layer is, however, only present on the fields 7, whereas this reflective layer is absent on the fields 8. At the lower side, the tape 1 abuts against the reflective surface 9 of a pressing means. A light beam 5 falling on the tape at the location of a field covered by a reflective layer 7 will be reflected at the top side of this layer. A light beam 6 incident at the location of a field on which the reflective layer is absent will pass through the air gap between the transparent tape 1 and the reflective surface 9, will be reflected at the said surface 9, will again pass through said air gap and will thereupon leave the information carrier tape 1 by passing through the tape. Upon leaving the tape the light beam 6 will consequently have covered a distance that is half a wave length longer than that of the light beam 5.

Figure 1C:
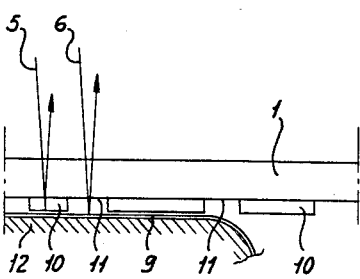

With reference to FIG. 1c, there is again shown a cross section of a tape according to the invention. At the side facing the pressing means, i.e. the lower side in the drawing, the transparent tape 1 is provided with a transparent layer which is present on the fields 10, but absent on the fields 11. This transparent layer may be integrated with the remainder of the transparent tape. The thickness of this transparent layer is selected such that the optical path length through this layer will be longer by $\frac{1}{4}$ of a wave length than the optical path length through a layer of air having the same thickness. A light beam 5 falling on the tape at the location of a field where the transparent layer is present, will pass through this layer, will be reflected on the reflective surface 9 of the pressing means and will again return through said layer and leave the carrier by passing through the tape. A light beam 6 falling on the tape at the location of a field where there is no transparent layer present, will leave the tape at the lower side, will run through the air gap between the lower side of the tape and the reflective surface 9 of the pressing means, will be reflected by said surface, will again traverse the said air gap and will thereupon pass again through the transparent tape. Upon reflection the light beam 5 will therefore have covered an optical path that is longer by half a wave length than the path covered by the beam 6 when reflected.

With reference to FIG. 2, there is shown a cross sectional view of a case provided with a tapelike carrier according to the invention. The reference numeral 20 indicates the housing of the case closed in a dustproof manner. Within the housing there are provided two reels 21 and 22 on which the tapelike carrier 23 is accommodated. This tapelike carrier runs over the pressing means 24, said pressing means being in the shape of a rotatably supported wheel. Facing the part of the side surface of the pressing means 24 on which the carrier 23 is present, there is provided a window 25 in the wall 20 of the case. Through this window the part of the tape abutting against the surface of the pressing means may be observed, whereas through this window there may also be thrown light on this part of the tape.

Figure 3:
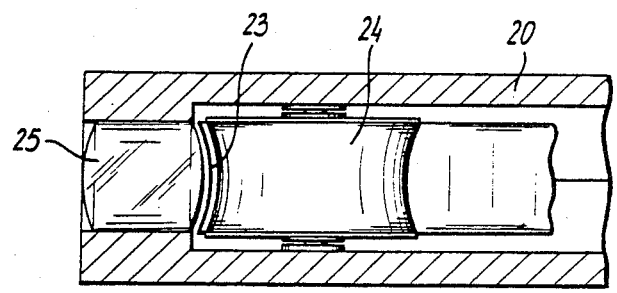
FIG. 3 shows a partial cross-sectional view of the case containing a carrier tape running over a concave-shaped rotatable pressing means.

As further shown in FIG. 3, the carrier tape 23 runs over the wheel 24 which is rotatably supported within case 20. The tape 23 is kept in an accurately fixed position with respect to the window 25 by the wheel 24 having a concave shape, so that the carrier tape will always occupy the same position with respect to the wheel pressing means and the window for accurately focusing light on the tape.

The invention also relates to an apparatus for writing, reading or erasing information on a tapelike information carrier present within a case. This apparatus is provided with a cavity for accommodating the case including the information carrier, as well as with means for keeping this case in the desired position within said cavity. It is advantageous that the exterior dimensions of the case correspond to those of the commercially available tape cassette.

The apparatus is designed in such a manner that provided the case is present within the cavity in the desired position, the window in the case will be facing focusing means mounted in the apparatus said focusing means being constructed in such a manner that they may focus the light emitted by a light source likewise mounted in the apparatus through the window in the case on the surface of the tape. It is advantageous that said focusing means include at least one cylindrical lens.

For reading information present on the tape there is utilized such a pulsating light source that the energy density of the light beam on the tape will be so low per one (composite) pulse that the nature of the material of the tape and of that of a layer optionally present on the tape will not be changed. It has been found that this will always be the case at an energy density for one pulse of less than 50 pico Joule per $\mu m^2$.

If there is utilized a tape provided with a reflective layer at the side facing the pressing means a part of this layer may be removed by focusing a light beam on this layer where the energy density on the tape per one (composite) pulse should be so small on the one hand that the nature of the transparent material of the tape will not be changed thereby but on the other hand so high that the material of the reflective layer is evaporated or atomized. It has been found that this will be the case at an energy density per one pulse of from 500 to 1500 pico Joule per $\mu m^2$.

If the tape is locally provided with a reflective layer of evaporable or atomizable material at the side facing the pressing means and if the reflective surface of the pressing means is coated with a layer of the same material, fields on the tape at which the reflective layer is absent may be "inserted" by focusing a light beam through such a field on the surface of the pressing means. The material present at that location on the surface of the pressing means will then be atomized or evaporated and precipitated onto the part of the surface of the tape facing said location whereby the latter will be coated with a reflective layer.

I claim:

1. A case provided with an information carrier tape one side of which has a structure for carrying optically readable information, which case comprises:

a closed dustproof housing encasing two rotatable rolls accommodating the tape, said housing being provided with a window having an inner and outer side for passing incident and reflected light to and from the tape, such that a part of the tape present between said two reels is visible through said window;

an information carrier tape movably accommodated on said two reels, said tape having an elongated length and a width dimension extending perpendicular to the tape length, and having alternately higher and lower fields of transparent material and a carrier structure located on one side of the tape opposite an external light source for receiving optical information through the window;

a pressing means provided within said case, said pressing means having an outer surface abutting against said movable carrier tape for continuously contacting and guiding the movable carrier tape in such manner that the part of said tape visible through said window is kept in an accurately fixed position with respect to the window, wherein said pressing means is positioned opposite to the window for continuously urging the part of said movable tape visible through said window against the inner side of the window, whereby the optically readable information is provided to and read from the movable carrier tape through the window using incident and reflected light from the external source.

2. A case provided with an information carrier for optically readable information according to claim 1, wherein said window is a cylindrical lens having a longitudinal axis which extends in the direction of the width of the tape, said lens having a length extending in the direction of the lens longitudinal axis at least equal to the width of said tape.

3. A case provided with an information carrier for optically readable information according to claim 1, wherein the surface of said pressing means abutting against said tape is of a concave shape in the direction of the width of the tape.

4. A case provided with an information carrier for optically readable information according to claim 1, wherein said pressing means is a disc rotatably supported within said case, said disc having a substantially cylindrical side wall.

5. A case provided with an information carrier for optically readable information according to claim 1, wherein the information carrying structure is present on that side of said tape abutting against said pressing means.

6. A case provided with an information carrier for optically readable information according to claim 1, wherein the surface of said pressing means abutting against said tape is reflective and the information carrying structure is comprised of fields of transparent material having an optical density of more than 1.2.

7. A case provided with an information carrier for optically readable information according to claim 1, wherein the surface of said pressing means abutting against said tape is reflective and the information carrying structure comprises fields of a transparent refractive material.

8. A case provided with an information carrier for optically readable information according to claim 7,
wherein the information carrying structure consists mainly of a material capable of being evaporated or atomized by means of a concentrated light.

9. A case provided with an information carrier for optically readable information according to claim 8, wherein said material is indium, tin or rhodium or an alloy of these metals.

10. A case provided with an information carrier for optically readable information according to claim 8,
wherein the reflective surface of said pressing means is coated with a layer consisting mainly of a material capable of being evaporated or atomized by means of concentrated light.

11. A case provided with an information carrier for optically readable information according to claim 10, wherein said material consists of indium, tin or rhodium or an alloy of these metals.

12. A case provided with an information carrier for optically readable information according to claim 7, wherein the reflective material on said tape has a thickness in selected areas less than the thickness on the remainder of said tape.

13. A case provided with an information carrier for optically readable information according to claim 1, wherein the information carrying structure consists mainly of a material the physical and chemical condition of which may be changed in an optically detectable manner by means of concentrated light.

14. A case provided with an information carrier for optically readable information according to claim 13, wherein the information carrying structure consists mainly of a material capable of existing in a crystalline condition as well as in an amorphous condition.

15. A case provided with an information carrier for optically readable information according to claim 13, wherein the information carrying structure consists mainly of a material capable of existing in a permanently magnetized condition as well as in a non-magnetized condition, with the reflectivities in these conditions being different.

16. A case provided with an information carrier tape one side of which has a structure for carrying optically readable information, said case comprising:

a closed dustproof housing encasing two rotatable reels accommodating the carrier tape;

a window having an inner and outer side provided in said housing, such that a part of the tape present between said two reels is visible through said window;

an information carrier tape movably accommodated on said two reels, said tape having an elongated length and a width dimension extending perpendicular to the tape length, and having alternately higher and lower fields of transparent material and a carrier structure on the side opposite an external light source for receiving optically readable information through said window;

a pressing means located within said case for guiding said movable carrier tape in such manner that the part of said tape visible through said window is kept in an accurately fixed position with respect to the window, wherein said pressing means consists of a rotatable wheel positioned opposite to the window for continuously urging that part of said movable tape visible through said window against the inner side of the window, said rotatable wheel having its outer surface abutting against said carrier tape and having a concave shape in the direction of the width of the tape, whereby the optically readable information is provided to and read from the carrier tape through the window using incident and reflected light from an external source.

17. A case provided with an information carrier tape, one side of the tape having a structure for carrying optically readable information, said case comprising:
 (a) a closed dustproof housing enclosing two rotatable reels for accommodating and moving the carrier tape;
 (b) a window provided in one side of said housing, such that a part of the tape present between said two reels is visible through said window;
 (c) an information carrier tape movably accommodated on said reels, said tape having alternately higher and lower fields of transparent material and a carrier structure on a side opposite from an external light source for receiving optically readable information through said window; and
 (d) a rotatable pressing means located within said housing for guiding the carrier tape in an accurately fixed position relative to said window, said rotatable pressing means having a concave shaped reflective surface abutting against said tape for continuously urging the part of said tape visible through said window in contact against the inner surface of the window, whereby the optically readable information is provided to and read from the carrier tape through said window using incident and reflected light from the external source.

* * * * *